(12) United States Patent
Tin

(10) Patent No.: US 8,350,936 B2
(45) Date of Patent: Jan. 8, 2013

(54) RECORDING SUCCESSIVE FRAMES OF RAW SENSOR DATA DEPICTING A MOVING SCENE

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 12/841,067

(22) Filed: Jul. 21, 2010

(65) Prior Publication Data

US 2012/0019694 A1    Jan. 26, 2012

(51) Int. Cl.
*H04N 3/14* (2006.01)
(52) U.S. Cl. ...................................... 348/273
(58) Field of Classification Search ............... 348/273
See application file for complete search history.

(56) References Cited

U.S. PATENT DOCUMENTS

| | | | |
|---|---|---|---|
| 3,971,065 A | | 7/1976 | Bayer |
| 5,418,565 A | * | 5/1995 | Smith ........................... 348/273 |
| 6,366,318 B1 | * | 4/2002 | Smith et al. .................. 348/272 |
| 7,412,107 B2 | | 8/2008 | Milanfar et al. |
| 7,523,078 B2 | | 4/2009 | Peot et al. |
| 7,596,284 B2 | | 9/2009 | Samadani |
| 2006/0113458 A1 | * | 6/2006 | Yang et al. ................. 250/208.1 |

OTHER PUBLICATIONS

S. Farsiu, "Fast and Robust Solutions to Imaging Inverse Problems with Varying Forward Models", May 12, 2003, pp. 1-20.
C. Stark, "Debayering Demystified", AstroPhoto Insight, print date Mar. 2010, pp. 5-9.
S. Farsiu, "First report on combing Demosaicing and Super-Resolution methods", print date Mar. 2010, pp. 1 to 8.
S. Farsiu, et al., "Multi-Frame Demosaicing and Super-Resolution From Under-Sampled Color Images", Jan. 2004, pp. 1-12.
S. Farsiu, et al., "Advances and Challenges in Super-Resolution", Mar. 9, 2004, pp. 1-27.
S. Farsiu, et al., "Dynamic Demosaicing and Color Super-Resolution of Video Sequences", Oct. 2004, pp. 1-8.
http://labs.adobe.com/technologies/cinemadng/, "Cinema DNG Initiative", print date: Jul. 20, 2010.
L. Xu, et al., "Single Sensor Imaging: Methods and Applications for Digital Cameras", edited by R. Lukac, Sep. 9, 2008, pp. 485-502.

* cited by examiner

*Primary Examiner* — James Hannett
(74) *Attorney, Agent, or Firm* — Fitzpatrick, Cella, Harper & Scinto

(57) ABSTRACT

The recording of successive frames of raw sensor data depicting a moving scene is provided. The raw sensor data comprises pixel data for an image sensor having pixels arranged in correspondence to a mosaic of plural different colors in a color filter array. A first sampling mosaic pattern for sampling the pixel data at a first resolution is designated. A second sampling mosaic pattern for sampling the pixel data at a second resolution which is lower than the first resolution is designated. One of the first or the second sampling mosaic patterns is selected for a frame by applying a predetermined rule. Pixel data of the frame is sampled using the selected sampling mosaic pattern. The sampled pixel data for the frame is recorded onto a recording medium.

21 Claims, 9 Drawing Sheets

Bayer 2x2 pattern

| G | R |
|---|---|
| B | G |

*FIG. 4*
PRIOR ART

4x4 portion of a 4K frame

| G | R | G | R |
|---|---|---|---|
| B | G | B | G |
| G | R | G | R |
| B | G | B | G |

*FIG. 5*

4x4 portion of a 2K frame

| G |   |   | R |
|---|---|---|---|
|   |   |   |   |
|   |   | G |   |
| B |   |   |   |

*FIG. 6*

RECORDING SUCCESSIVE FRAMES OF RAW SENSOR DATA DEPICTING A MOVING SCENE

FIELD

The invention relates to the field of recording image data, and more particularly relates to recording successive frames of raw sensor data depicting a moving scene.

BACKGROUND

The advent of the tapeless workflow for video images has simplified production and post-production, amounting to significant cost saving. For example, output from a digital camera can be directly converted to a digital intermediate format, without having to undergo the typically expensive process of digitizing (or scanning) film. In addition, post-production such as editing and color correction can be done on relatively inexpensive desktop systems.

In a tapeless workflow as is used in television or movie production, it may be required that the images be acquired and outputted with as minimal in-camera processing as possible. This requirement allows for more latitude in altering the footage for post-production, such as changing the exposure and color. As such, this requirement typically translates to outputting raw sensor data.

One trend in video capture is high definition capture. In this regard, the acquisition format is not necessarily the same as the delivery format. For an example in acquisition format, movie cameras can often support 4K capture or higher, where 4K describes the horizontal pixel dimension. However, if the delivery format is HDTV, then the resolution is typically 1920×1080, which is smaller. A common approach is to capture as high a resolution as possible, and to downsample in post-production.

Another trend for video capture is high frame rate. Similar to resolution, the acquisition frame rate may not be the same as the delivery frame rate. For example, one reason for the acquisition frame rate to be higher than the delivery frame rate is to achieve a slow motion effect, which can be best for fast action sequences such as explosions. In addition, as high end display/TV systems tend to support high refresh rates, there is a tendency for newer broadcasting or video standards to allow higher frame rates.

As such, there are trends to support high resolution and high frame rate for video capture. By using raw sensor data output, however, data transfer rate and storage capacity of recording mediums can be limiting factors. Accordingly, there is a desire to output raw sensor data with reduced data transfer rate.

SUMMARY

Disclosed embodiments describe devices and methods for recording successive frames of raw sensor data depicting a moving scene. The raw sensor data comprises pixel data for an image sensor having pixels arranged in correspondence to a mosaic of plural different colors in a color filter array. A first sampling mosaic pattern for sampling the pixel data at a first resolution is designated. A second sampling mosaic pattern for sampling the pixel data at a second resolution which is lower than the first resolution is designated. One of the first or the second sampling mosaic patterns is selected for a frame by applying a predetermined rule. Pixel data of the frame is sampled using the selected sampling mosaic pattern. The sampled pixel data for the frame is recorded onto a recording medium.

Thus, in an example embodiment described herein, a method of recording successive frames of raw sensor data depicting a moving scene is provided. The raw sensor data comprises pixel data for an image sensor having pixels arranged in correspondence to a mosaic of plural different colors in a color filter array. The method comprises designating a first sampling mosaic pattern for sampling the pixel data at a first resolution, designating a second sampling mosaic pattern for sampling the pixel data at a second resolution which is lower than the first resolution, selecting one of the first or the second sampling mosaic patterns for a frame by applying a predetermined rule, sampling pixel data of the frame using the selected sampling mosaic pattern, and recording the sampled pixel data for the frame onto a recording medium.

In a further example embodiment, an apparatus comprising a computer-readable memory constructed to store computer-executable process steps, and a processor constructed to execute the computer-executable process steps stored in the memory is provided. The process steps stored in the memory cause the processor to record successive frames of raw sensor data depicting a moving scene, the raw sensor data comprising pixel data for an image sensor having pixels arranged in correspondence to a mosaic of plural different colors in a color filter array. The process steps comprise designating a first sampling mosaic pattern for sampling the pixel data at a first resolution, designating a second sampling mosaic pattern for sampling the pixel data at a second resolution which is lower than the first resolution, selecting one of the first or the second sampling mosaic patterns for a frame by applying a predetermined rule, sampling pixel data of the frame using the selected sampling mosaic pattern, and recording the sampled pixel data for the frame onto a recording medium.

In yet a further example embodiment, a computer-readable memory medium on which is stored computer-executable process steps for causing a computer to perform recording successive frames of raw sensor data depicting a moving scene is provided. The raw sensor data comprises pixel data for an image sensor having pixels arranged in correspondence to a mosaic of plural different colors in a color filter array. The process steps comprise designating a first sampling mosaic pattern for sampling the pixel data at a first resolution, designating a second sampling mosaic pattern for sampling the pixel data at a second resolution which is lower than the first resolution, selecting one of the first or the second sampling mosaic patterns for a frame by applying a predetermined rule, sampling pixel data of the frame using the selected sampling mosaic pattern, and recording the sampled pixel data for the frame onto a recording medium.

Repeated application of the steps of selecting, sampling and recording can be performed, for successive frames of the moving scene, whereby a mixed resolution sequence of mosaiced frames of pixel data is recorded on the recording medium. The second sampling mosaic pattern can be a subset of the first sampling mosaic pattern.

The color filter array can be composed of a repeated pattern of plural different colors having a predesignated ratio of green pixels to red pixels and to blue pixels. The predesignated ratio can be substantially maintained in both of the first and second sampling mosaic patterns. The color filter array can correspond to a Bayer pattern. The predetermined rule can select one of the first or second sampling mosaic patterns based on a frame sequential number.

In a further example embodiment, a method of reconstructing image data for successive frames of a moving scene is provided. The method comprises accessing a mixed resolution sequence of mosaiced frames of raw sensor data recorded on a recording medium, wherein the raw sensor data comprises pixel data for an image sensor having pixels arranged in correspondence to a mosaic of plural different colors in a color filter array. Each frame of the mixed resolution sequence of mosaiced frames of raw sensor data comprises pixel data sampled at one of at least first and second sampling mosaic patterns respectively corresponding to first and second resolutions in which the second resolution is lower than the first resolution. The method further comprises identifying whether an active frame corresponds to the first sampling mosaic pattern or to the second sampling mosaic pattern, and applying first or second processing to the active frame in respective correspondence to the identification of whether the active frame corresponds to the first sampling mosaic pattern or to the second sampling mosaic pattern. The first processing demosaics the raw sensor data by using the raw sensor data for the active frame, so as to obtain image data for the active frame. The second processing demosaics the raw sensor data by using the raw sensor data for the active frame as well as raw sensor data for a high resolution frame in close temporal proximity to the active frame, so as to obtain image data for the active frame. In addition, the method comprises outputting the image data for each frame for at least temporary storage and rendering.

In yet a further example embodiment, an apparatus comprising a computer-readable memory constructed to store computer-executable process steps, and a processor constructed to execute the computer-executable process steps stored in the memory is provided. The process steps stored in the memory cause the processor to reconstruct image data for successive frames of a moving scene. The process steps comprise accessing a mixed resolution sequence of mosaiced frames of raw sensor data recorded on a recording medium, wherein the raw sensor data comprises pixel data for an image sensor having pixels arranged in correspondence to a mosaic of plural different colors in a color filter array. Each frame of the mixed resolution sequence of mosaiced frames of raw sensor data comprises pixel data sampled at one of at least first and second sampling mosaic patterns respectively corresponding to first and second resolutions in which the second resolution is lower than the first resolution. The process steps further comprise identifying whether an active frame corresponds to the first sampling mosaic pattern or to the second sampling mosaic pattern, and applying first or second processing to the active frame in respective correspondence to the identification of whether the active frame corresponds to the first sampling mosaic pattern or to the second sampling mosaic pattern. The first processing demosaics the raw sensor data by using the raw sensor data for the active frame, so as to obtain image data for the active frame. The second processing demosaics the raw sensor data by using the raw sensor data for the active frame as well as raw sensor data for a high resolution frame in close temporal proximity to the active frame, so as to obtain image data for the active frame. In addition, the process steps comprise outputting the image data for each frame for at least temporary storage and rendering.

In yet a further example embodiment, a computer-readable memory medium on which is stored computer-executable process steps for causing a computer to perform reconstructing image data for successive frames of a moving scene is provided. The process steps comprise accessing a mixed resolution sequence of mosaiced frames of raw sensor data recorded on a recording medium, wherein the raw sensor data comprises pixel data for an image sensor having pixels arranged in correspondence to a mosaic of plural different colors in a color filter array. Each frame of the mixed resolution sequence of mosaiced frames of raw sensor data comprises pixel data sampled at one of at least first and second sampling mosaic patterns respectively corresponding to first and second resolutions in which the second resolution is lower than the first resolution. The process steps further comprise identifying whether an active frame corresponds to the first sampling mosaic pattern or to the second sampling mosaic pattern, and applying first or second processing to the active frame in respective correspondence to the identification of whether the active frame corresponds to the first sampling mosaic pattern or to the second sampling mosaic pattern. The first processing demosaics the raw sensor data by using the raw sensor data for the active frame, so as to obtain image data for the active frame. The second processing demosaics the raw sensor data by using the raw sensor data for the active frame as well as raw sensor data for a high resolution frame in close temporal proximity to the active frame, so as to obtain image data for the active frame. In addition, the process steps comprise outputting the image data for each frame for at least temporary storage and rendering.

It is possible for the first processing to only use the raw sensor data for the active frame. The second processing can use raw sensor data for a pair of high resolution frames in close temporal proximity before and after the active frame, and can apply interpolation to the raw sensor data for the pair of high resolution frames.

It is possible for the second processing to only use interpolated data for pixels of the active frame corresponding to high resolution sites for which data is not available, and to only use raw sensor data of the active frame for pixels of the active frame corresponding to high resolution sites for which data is available. The color filter array can correspond to a Bayer pattern.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 4 is a diagram illustrating an example of a Bayer color filter array (CFA) according to an example embodiment.

FIG. 5 is a diagram illustrating a 4×4 portion of pixels in a 4K frame according to an example embodiment.

FIG. 6 is a diagram illustrating a 4×4 portion of pixels in a 2K frame according to an example embodiment.

DETAILED DESCRIPTION

Figure 1:
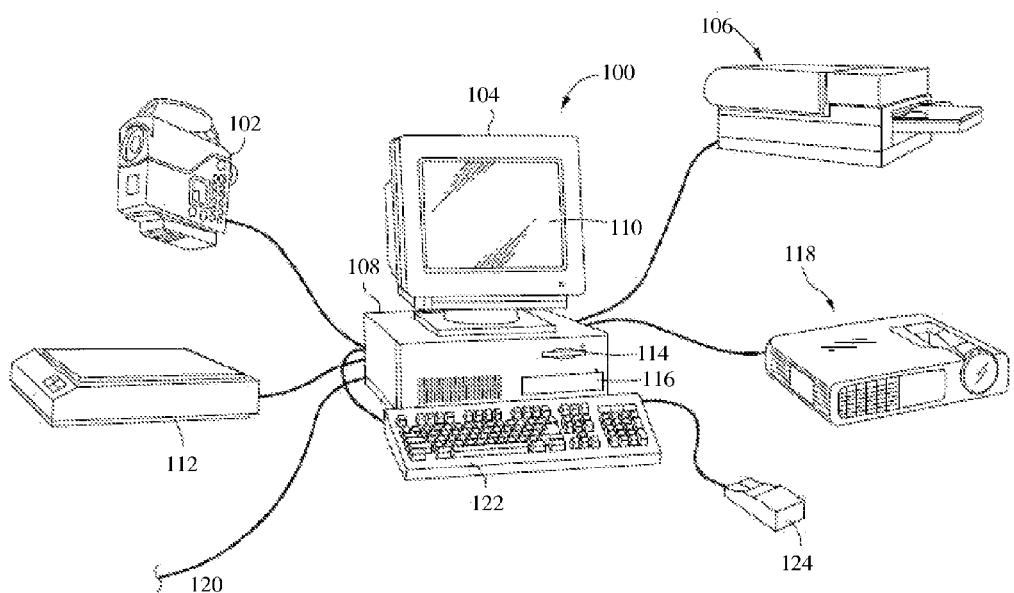
FIG. 1 is a representative view of computing equipment relevant to an example embodiment.

FIG. 1 is a representative view of computing equipment, peripherals and digital devices, relevant to an example embodiment. Computing equipment 100 includes host computer 108 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 100 includes color monitor 104 including display screen 110, keyboard 122 for entering text data and user commands, and pointing device 124. Pointing device 124 preferably comprises a mouse for pointing and for manipulating objects displayed on display screen 110.

Host computer 108 also includes computer-readable memory media such as computer hard disk 116 and DVD disc drive 114, which are constructed to store computer-readable information such as computer-executable process steps. DVD disc drive 114 provides a means whereby host computer 108 can access information, such as image data, computer-executable process steps, application programs, etc. stored on removable memory media. In an alternative, information can also be retrieved through other computer-readable media such as a USB storage device connected to a USB port (not shown), or through network interface 120. Other devices for accessing information stored on removable or remote media may also be provided.

Digital camera 102 is an example of a color input device, and is provided for sending digital image data to host computer 108. In the example embodiments described herein, digital camera 102 is capable of video capture, and can correspond, for example, to a video camcorder or a still-picture camera (e.g., DSLR) with video recording capability. Digital color scanner 112 is another example of a color input device, and is provided for scanning documents and images and sending the corresponding image data to host computer 108.

Projector 118 is an example of a color output device, and is provided for projecting images in accordance with image data from host computer 108 onto a projection screen (not shown). Printer 106 is another example of a color output device, and is provided for forming color images in accordance with image data from host computer 108 onto a medium such as paper.

Of course, host computer 108 may acquire digital image data from other sources such as a local area network or the Internet via network interface 120. Likewise, host computer 108 may interface with other color output devices, such as color output devices accessible over network interface 120.

Figure 2:
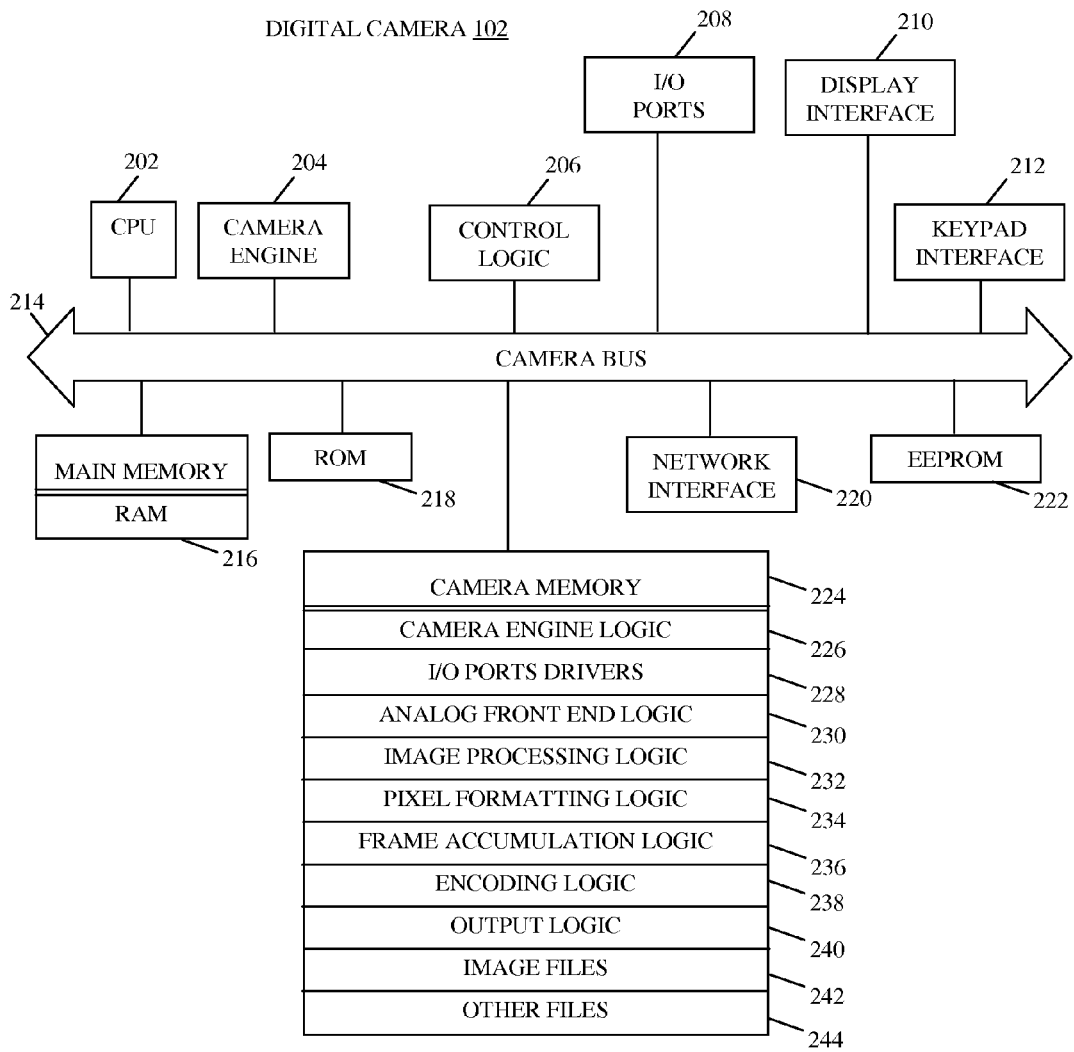
FIG. 2 is a block diagram depicting the internal architecture of the digital camera shown in FIG. 1, according to an example embodiment.

FIG. 2 is a block diagram depicting the internal architecture of digital camera 102 shown in FIG. 1, according to an example embodiment. As noted above, for the example embodiments described herein, digital camera 102 can correspond to any digital camera with video-recording capability. Digital camera 102 can include a central processing unit (CPU) 202 such as a programmable microprocessor which can interface to camera bus 214. Control logic 206, which can be utilized to control camera engine 204 of digital camera 102, I/O ports 208 which can be used to communicate with various input/output devices of digital camera 102 (not shown), network interface 220 which can be utilized to interface digital camera 102 to network 106, display interface 210 which can interface to a display (not shown) associated with digital camera 102, and keypad interface 212 which interfaces to a keypad (or keyboard) associated with digital camera 102 can also be coupled to camera bus 214.

EEPROM 222, which can be used for containing non-volatile program instructions, random access memory (RAM) 216, camera memory 224 and read-only memory (ROM) 218 can also be coupled to camera bus 214. RAM 216 can interface to camera bus 214 to provide CPU 202 with access to memory storage, thereby acting as the main run-time memory for CPU 202. In particular, when executing stored program instruction sequences, CPU 202 can load those instruction sequences from camera memory 224 (or other memory media) into RAM 216 and can execute those stored program instruction sequences out of RAM 216. ROM 218 can store invariant instruction sequences, such as start-up instruction sequences for CPU 202 or BIOS sequences for the operation of various peripheral devices of digital camera 102 (not shown).

Camera memory 224 is one example of a computer-readable medium that can store program instruction sequences executable by CPU 202 so as to constitute camera engine logic 226, I/O port drivers 228, analog front end logic 230, image processing logic 232, pixel formatting logic 234, frame accumulation logic 236, encoding logic 238 and output logic 240. Camera engine logic 226 can control and drive camera engine 204 of digital camera 102 so as to perform a function (e.g., video image capture) for data associated with digital camera 102. For example, such data can be sent to or received from digital camera 102 over network 106. I/O port drivers 228 can be utilized to drive input and output devices connected through I/O ports 208. Image files 242 can include video or still-image files captured by digital camera 102. In addition, other files 244 can include files and/or programs for the operation of digital camera 102.

Analog front end logic 230, image processing logic 232, pixel formatting logic 234, frame accumulation logic 236, encoding logic 238 and output logic 240 can be used for recording successive frames of raw sensor data depicting a moving scene. For example, the raw sensor data can comprise pixel data for an image sensor having pixels arranged in correspondence to a mosaic of plural different colors in a color filter array. A first sampling mosaic pattern for sampling the pixel data at a first resolution can be designated, and a second sampling mosaic pattern for sampling the pixel data at a second resolution which is lower than the first resolution can be designated. One of the first or the second sampling mosaic patterns can be selected for a frame by applying a predetermined rule. Pixel data of the frame can be sampled using the selected sampling mosaic pattern. The sampled pixel data for the frame can be recorded onto a recording medium.

In addition, analog front end logic 230, image processing logic 232, pixel formatting logic 234, frame accumulation logic 236, encoding logic 238 and output logic 240 can correspond to an imaging pipeline. The imaging pipeline will be described in greater detail below with reference to FIG. 7.

Figure 3:
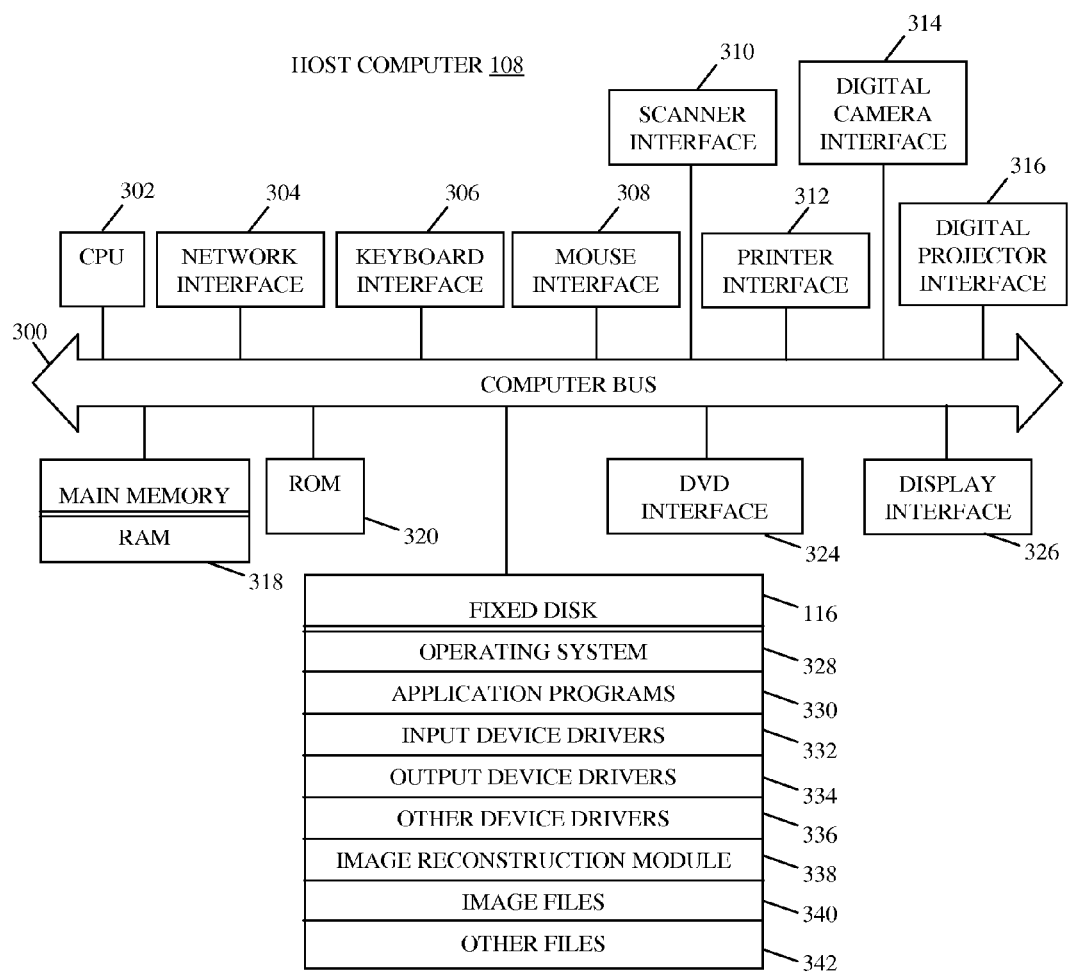
FIG. 3 is a block diagram depicting the internal architecture of the host computer shown in FIG. 1 according to an example embodiment.

FIG. 3 is a block diagram showing the internal architecture of host computer 108 of computing equipment 100. As shown in FIG. 3, host computer 108 includes central processing unit (CPU) 302 which interfaces with computer bus 300. Also interfacing with computer bus 300 are hard disk 116, network interface 304, random access memory (RAM) 318 for use as a main run-time transient memory, read only memory (ROM) 320, DVD disc interface 324, display interface 326 for monitor 104, keyboard interface 306 for keyboard 122, mouse interface 308 for pointing device 124, scanner interface 310 for scanner 112, printer interface 312 for printer 106, digital camera interface 314 for digital camera 102, and digital projector interface 316 for digital projector 118.

RAM 318 interfaces with computer bus 300 so as to provide information stored in RAM 318 to CPU 302 during execution of the instructions in software programs such as an operating system, application programs and device drivers. More specifically, CPU 302 first loads computer-executable process steps from fixed disk 116, or another storage device into a region of RAM 318. CPU 302 can then execute the stored process steps from RAM 318 in order to execute the loaded computer-executable process steps. Data such as video image data or other information can be stored in RAM 318, so that the data can be accessed by CPU 302 during the execution of computer-executable software programs, to the extent that such software programs have a need to access and/or modify the data.

As also shown in FIG. 3, hard disk 116 contains operating system 328, application programs 330, such as word processing programs or graphic image management programs Hard disk 116 also contains device drivers for software interface to devices, such as input device drivers 332, output device drivers 334, and other device drivers 336. Image files 340, including video image files, and other files 342 can be captured by color input devices and provided to host computer 108. In addition, these files can be available for output to color output devices and for manipulation by application programs.

Image reconstruction module 338 can be used to reconstruct image data for successive frames of a moving scene. For example, such successive frames can correspond to those output to a recording medium by output logic 240 of FIG. 2. Image reconstruction module 338 can comprise computer-executable process steps to access a mixed resolution sequence of mosaiced frames of raw sensor data recorded on a recording medium. The raw sensor data can comprise pixel data for an image sensor having pixels arranged in correspondence to a mosaic of plural different colors in a color filter array. Each frame of the mixed resolution sequence of mosaiced frames of raw sensor data can comprise pixel data sampled at one of at least first and second sampling mosaic patterns respectively corresponding to first and second resolutions in which the second resolution is lower than the first resolution. The computer-executable process steps can further comprise identifying whether an active frame corresponds to the first sampling mosaic pattern or to the second sampling mosaic pattern, and applying first or second processing to the active frame in respective correspondence to the identification of whether the active frame corresponds to the first sampling mosaic pattern or to the second sampling mosaic pattern. The first processing can demosaic the raw sensor data by using the raw sensor data for the active frame, so as to obtain image data for the active frame. The second processing can demosaic the raw sensor data by using the raw sensor data for the active frame as well as raw sensor data for a high resolution frame in close temporal proximity to the active frame, so as to obtain image data for the active frame. In addition, the computer-executable process steps can comprise outputting the image data for each frame for at least temporary storage and rendering.

Image reconstruction module 338 may be configured as a part of operating system 328, as part of a device driver (e.g., digital camera driver, printer driver), or as a stand-alone application program. Image reconstruction module 338 may also be configured as a plug-in or dynamic link library (DLL) to the operating system, device driver or application program. For example, image reconstruction module 338 according to example embodiments may be incorporated in an input/output device driver for execution in a computing device, embedded in the firmware of an input/output device, or provided in a stand-alone application for use on a general purpose computer. In one example embodiment described herein, image reconstruction module 338 is incorporated directly into the operating system for general purpose host computer 108. It can be appreciated that the present disclosure is not limited to these embodiments and that the disclosed image reconstruction module 338 may be used in other environments.

As noted above, one trend in video capture is high definition capture. In this regard, acquisition resolution is typically described by the horizontal pixel dimension. For example, 2K refers to a horizontal pixel dimension of 2048, whereas 4K refers to a horizontal pixel dimension of 4096. Further, the acquisition format is not necessarily the same as the delivery format. For example, if the delivery format is HDTV, then the resolution is typically 1920×1080. On the other hand, Digital Cinema Initiatives (DCI) specification defines 2K cinema as 2048×1024 and 4K cinema as 4096×2048. However, even if the final delivery format is a lower resolution such as HD, a common approach is to capture as high resolution as possible and to downsample in the post-production. In this regard, 4K capture is becoming more common in many movie cameras, with higher resolutions such as 6K or higher being possible.

Another trend in video capture is high frame rate. Similar to resolution, there is a delivery frame rate that is typically standardized. For example, 24 fps is the typical frame rate for cinema (e.g., for emulating the "film look"), and 29.97 fps is the typical frame rate for the NTSC TV signal. However, there are reasons for capturing at a different frame rate. For example, the acquisition frame rate can be higher than the delivery frame rate to achieve a slow motion effect, for fast action sequences such as explosions. In addition, as high end display/TV systems tend to support high refresh rates, there is a tendency for newer broadcasting or video standards to allow higher frame rate.

Thus, there is a need for a camera to support high resolution and high frame rate. However, data transfer rate and storage capacity of recording mediums can be limiting factors. A CompactFlash (CF) card is one example of such a recording medium. Ordinarily, in consumer and prosumer digital cameras, where the image data is outputted in a highly compressed format, data transfer rate and storage capacity of recording medium do not pose a serious limitation. However, with raw and possibly uncompressed sensor data output, data transfer rate and storage capacity of recording medium can be a limiting factor for high resolution, and high frame rate capture.

More specifically, the following equations can be used to describe the difficulties for uncompressed raw data:

Data rate (in bits per second)=no. of pixels per frame× bits per pixel×fps     (Formula 1)

File size (in bytes)=data rate×time (in seconds)/8     (Formula 2)

For example, when capturing image data at 4K 2:1 format (i.e., at 4096×2048), 30 fps, and recording in linear, uncompressed 12-bit data, data rate can be calculated as follows:

Data rate=4096×2048×12×30=2.8125 Gib/sec     (Formula 3)

Thus, a 60-second clip would typically require 2.8125×60/8=21.09375 GiB. In this example, both date rate and file size can exceed the capability of a generally affordable high speed CF card.

One conventional solution that has been implemented in some camera products is to use a form of data compression. Unlike rendered RGB data (e.g., sRGB), however, linear light sensor data may not be amenable to well known compression algorithms such as H.264 (MPEG-4 AVC) or VC-1 (SMPTE 421M). Further, such compression generally introduces artifacts to the camera raw data, and these artifacts may be difficult to fix in the post-production. Thus, there may be a practical implication that, when shooting at high resolution such as 4K, one is limited to lower frame rate, such as 24 fps.

As such, according to example aspects of the disclosure, data rate and file size can be reduced by using variable frame resolutions. More specifically, recording can be performed with a set of high resolution frames interlaced with one or more sets of lower resolution frames, where the pixels in the lower resolution frames are a subset of the high resolution pixels. Because of the interlacing of high and low resolution frames, the lower resolution frames can be reconstructed at the high resolution during demosaicing. Furthermore, data rate during recording can be reduced compared to recording all frames exclusively at the high resolution. In addition, the sensor data in each frame may be uncompressed, or compressed using an algorithm that introduces minimal artifacts, while the resolution of each frame may change with time.

According to an example embodiment, higher resolution frames can be interlaced with lower resolution frames in the same timeline. For example, 4K frames can be interlaced with 2K frames. In terms of data rate, this typically results in an equivalent date rate of $[(4^2+2^2)/2]^{1/2}=3.16K$ capture, and this 3.16K capture can have improved quality when compared to standard 3K capture. In particular, a standard 3K capture typically uses a smaller portion of the sensor and therefore has a narrower field of view. In cinematic applications, this can have a significant negative impact on the cinema feel.

A discussion of higher and lower resolution frames will now be provided with reference to FIGS. 4 to 6. FIG. 4 is a diagram illustrating an example of a Bayer color filter array (CFA) according to an example embodiment. A Bayer CFA typically corresponds to an arrangement of RGB color filters on a square grid of photosensors. In the example embodiment of FIG. 4, Bayer CFA corresponds to a 2×2 pattern having 50% green, 25% red and 25% blue. Although FIG. 4 illustrates a particular pattern for green, red and blue, it should be noted that other patterns can be used.

FIG. 5 is a diagram illustrating a 4×4 portion of pixels in a 4K frame according to an example embodiment. In a 4K frame, the above pattern from FIG. 4 for green, red and blue is repeated.

FIG. 6 is a diagram illustrating a 4×4 portion of pixels in a 2K frame according to an example embodiment. In a 2K frame, although every pixel of the 4K imaging plane is exposed to the scene, only selected 2K pixels are written to the recording medium, as seen in FIG. 6. Further, the blank pixels denote pixels that will not be outputted to the recording medium. It can be appreciated that this sampling pattern is a subset of the full sampling pattern in FIG. 5.

Figure 7:
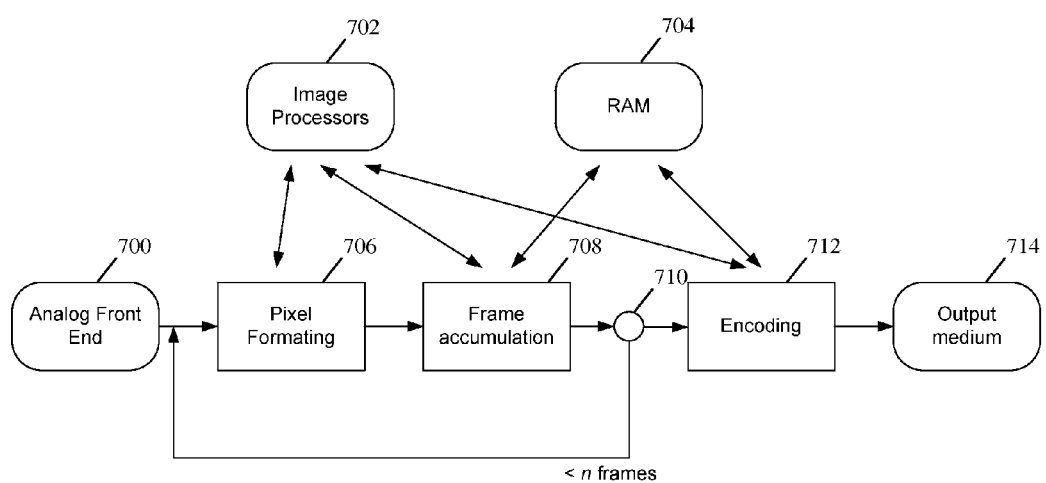
FIG. 7 is a block diagram depicting an imaging pipeline of a digital camera according to an example embodiment.

FIG. 7 is a block diagram depicting an imaging pipeline of a digital camera according to an example embodiment. For example, the imaging pipeline of FIG. 7 can correspond to analog front end logic 230, image processing logic 232, pixel formatting logic 234, frame accumulation logic 236, encoding logic 238, output logic 240 and RAM 216 of FIG. 2.

Analog front end (AFE) 700 of FIG. 7 can encompass the (analog) optics and the analog to digital conversion of light energy to electrical energy in an image sensor of the digital camera in a digital format. AFE 700 can also perform other functions such as timing. Pixel formatting block 706 can prepare the digital frames based on user-chosen parameters, such as resolution and aspect ratio.

Frame accumulation block 708 can then accumulate the prepared frames in on-board memory (e.g., RAM 704). The number of frames can be accumulated in a loop, for example, using loop element 710. When a predetermined number (n) frames are accumulated, the data can be encoded (encoding block 712). Encoding of the data will be described in more detail below. The encoded data, such as in a proprietary raw format, can then be written to the recording medium (output medium block 714).

As can be seen in FIG. 7, processing by pixel formatting block 706, frame accumulation block 708 and encoding block 712 can be performed by one or more image processors (image processors block 702). Furthermore, frame accumulation block 708 and encoding block 712 may store data in RAM 704.

Figure 8:
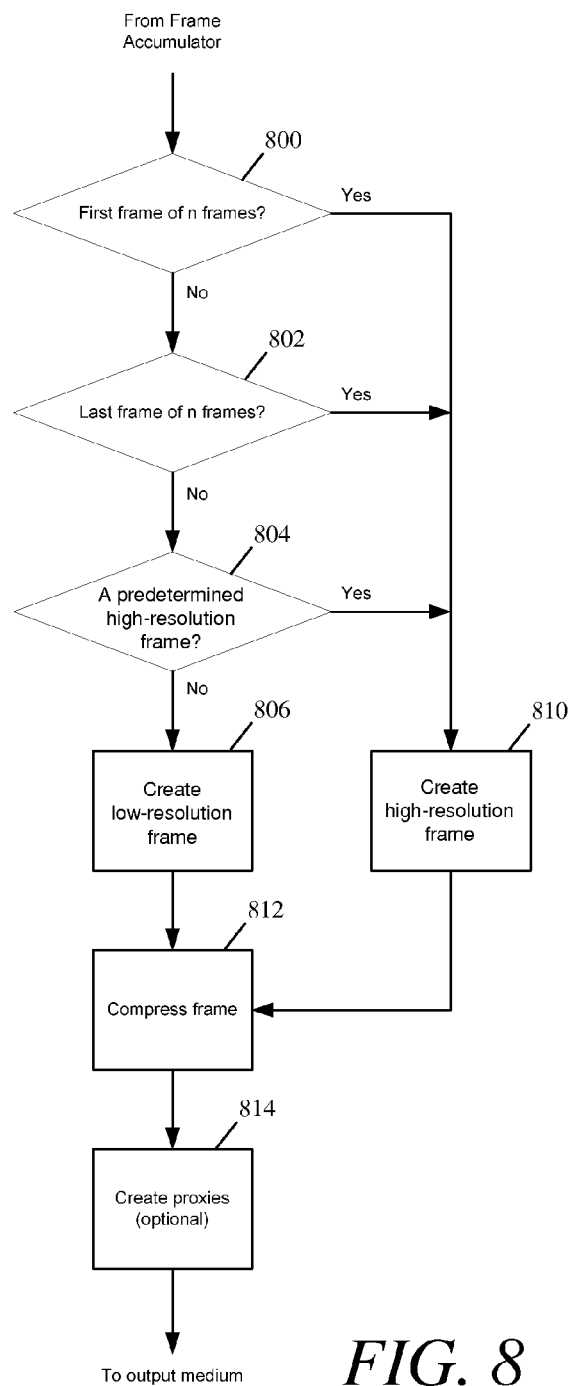
FIG. 8 is a flow diagram illustrating an encoding process associated with recording successive frames of raw sensor data, according to an example embodiment.

FIG. 8 is a flow diagram illustrating an encoding process associated with recording successive frames of raw sensor data, according to an example embodiment. For example, the encoding process of FIG. 8 can correspond to the encoding performed by encoding block 712 of FIG. 7.

In general, each of the accumulated n frames is processed to determine if it is a high-resolution frame (e.g., 4K frame) or a low-resolution frame (e.g., 2K frame). For a high-resolution frame, the data is unaltered. For a low-resolution frame, only data from selected pixels, which can for example be determined by the pattern in FIG. 6, is outputted. In this regard, a strategy for distribution of high-resolution and low-resolution frames can be pre-determined, for example, based on target data rate.

In the example embodiment of FIG. 8, the first and last frame of the group of n frames are always high-resolution frames, and low-resolution frames are distributed between the first and last frame according to a predetermined rule. Thus, in FIG. 8, an inquiry is made as to whether a current frame from frame accumulation block 708 is the first of n frames (decision diamond 800). If the answer to this inquiry is yes, a high resolution frame is created (block 810). As noted above, for a high-resolution frame, the data is unaltered. If the answer to the above inquiry is no, an inquiry is made as to whether the current frame is the last of n frames (decision diamond 802). If the answer to this inquiry is yes, a high resolution frame is created (block 810).

At decision diamond 804, an inquiry is made as to whether the current frame is a high-resolution frame according to a predetermined rule. If this answer to this inquiry is yes, a high resolution frame is created (block 810). Otherwise, a low-resolution frame is created. As noted above, for a low-resolution frame, only data from selected pixels is outputted.

An embodiment of the predetermined rule is for n to be an odd integer and the low resolution frames to be interlaced with the high resolution frames, i.e., a low resolution frame occurring at every other frame between the first and last (high resolution) frames of the n frames.

After the high-resolution or low-resolution frame is created, the frame is compressed (block 812). For example, the compression can be either a mathematically lossless or visually lossless algorithm, which can be wavelet based (e.g., the algorithm used in the JPEG2000 standard).

In addition to creating the raw frames, it may be desirable to create multiple low resolution images, or proxies. Thus, after compression, an option of creating proxies can occur (block 814). Proxies are generally used in offline editing, which is a step in the post-production. Original images are often too large for efficient manipulation on an editing system, so proxies can be used in offline editing, resulting in an edit decision list (EDL). The EDL can then be used in further online editing and color grading, when the original images in high resolution will be used. It should be noted that proxies are typically small files referencing the original images. In other words, proxies typically contain pointers to the original multi-resolution images, and not image files themselves.

It is typical for the proxies to have resolutions that are successively halved. For example, if the original raw images are in 4K, the proxies would typically be in 2K, 1K, ½K, etc. In this regard, for the example embodiment of 4K high-resolution frames, 2K low-resolution frames can enable proxies to be created by simple sub-sampling, without creating new pixels. In other words, no lengthy in-camera processing is typically needed to generate the proxies.

Figure 9:
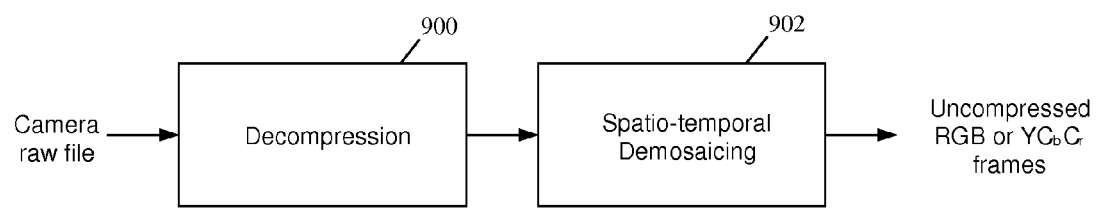
FIG. 9 is a flow diagram illustrating a decoding process associated with recording successive frames of raw sensor data, according to an example embodiment.

FIG. 9 is a flow diagram illustrating a decoding process associated with recording successive frames of raw sensor data, according to an example embodiment. Decoding typically occurs during the ingesting phase in post-production, and the process may be executed by a dedicated hardware system or a desktop computer system with specialized software. For example, host computer 108 of FIG. 3 can be used for decoding.

A file containing the compressed raw sensor data in a predetermined format can be read from a recording medium. For example, the file could have been previously created by a digital camera in a shooting session. The editing system, typically installed with the necessary codec, either in hardware or software, can decode the data format, including uncompressing the frames, if compression has been applied (block 900). Next, demosaicing can be performed (block 902). In the example embodiments described herein, demosaicing occurs in the spatio-temporal domain. As can be seen in FIG. 9, the result is uncompressed RGB or $YC_bC_r$ frames that can be displayed on the editing or grading system using a computer monitor and/or broadcast monitor.

Figure 10:
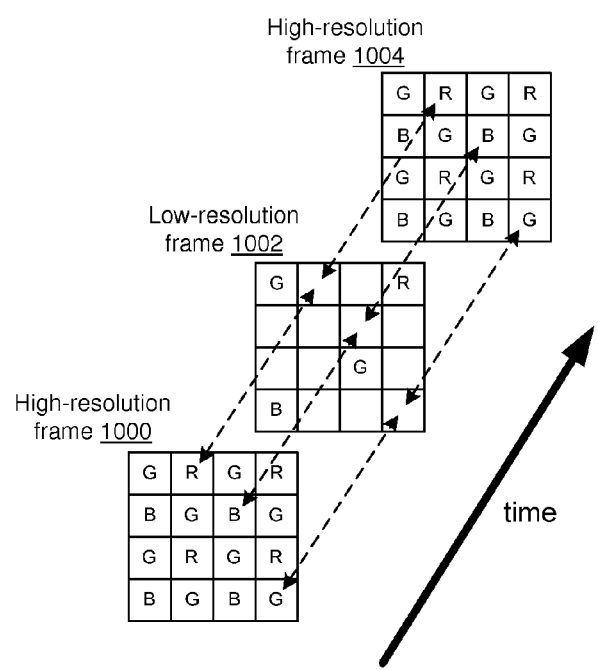
FIG. 10 is a block diagram illustrating a spatio-temporal demosaicing according to an example embodiment.

FIG. 10 is a block diagram illustrating a spatio-temporal demosaicing according to an example embodiment. It should be noted that for conventional Bayer demosaicing, it may be necessary to estimate 2 missing color channels in a given pixel. However, for reconstruction of low-resolution frames according to example aspects of this disclosure, some pixels have all 3 color channels missing.

Thus, reconstruction of low-resolution frames typically occurs in the spatio-temporal domain. In other words, a pixel missing all 3 color channels would typically need to be estimated using not only spatially neighboring pixels, but also temporally neighboring pixels, from sandwiching (e.g., previous and subsequent) high-resolution frames. In the example of FIG. 10, pixels missing all 3 color channels in low-resolution frame 1002 can be estimated using not only spatially neighboring pixels, but also temporally neighboring pixels from high-resolution frames 1000 and 1004.

Figure 11:
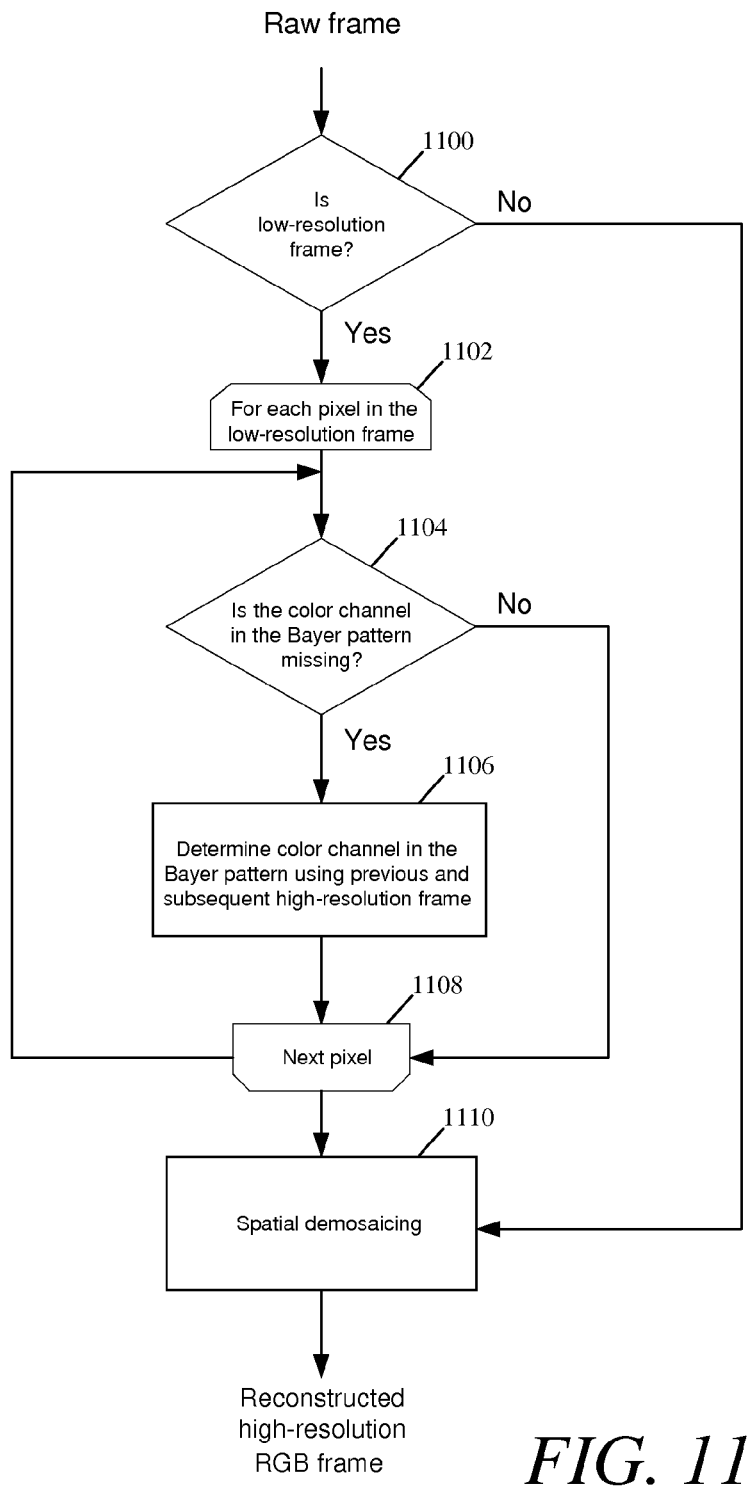
FIG. 11 is a flow diagram illustrating the reconstruction of an RGB frame according to an example embodiment.

FIG. 11 is a flow diagram illustrating the reconstruction of an RGB frame according to an example embodiment. In general, in the example embodiment of FIG. 11, if the raw frame is a high-resolution frame, demosaicing is typically only performed spatially. However, when the frame is a low-resolution frame, an intermediate high-resolution frame can first be constructed by linear interpolation between the sandwiching (e.g., previous and subsequent) high-resolution raw frames. This corresponds to a 1-dimensional interpolation in the time domain. An interpolated high-resolution raw frame results, at which point normal spatial demosaicing step can be performed.

As can be seen in FIG. 11, at decision diamond 1100, an inquiry is made as to whether a raw frame is a low-resolution frame. If the answer to this inquiry is no, then the frame is high-resolution, and spatial demosaicing is performed (block 1100). If the answer to this inquiry is yes, for each pixel in the low-resolution frame (block 1102), an inquiry is made if the color channel in the Bayer pattern is missing (decision diamond 1104). If the answer to this inquiry is yes, the color channel in the Bayer pattern is determined using previous and subsequent high-resolution frames (block 1106). Otherwise, the next pixel is considered (block 1108), and the process steps defined by blocks 1104 and 1106 are repeated for all pixels in the low-resolution frame.

Thus, by a mixture of high and low resolution frames, the lower resolution frames can be reconstructed at the high resolution using temporally neighboring high-resolution frames during demosaicing. Furthermore, data rate during recording can be reduced compared to recording all frames exclusively at the high resolution. In addition, the sensor data in each frame may be uncompressed, or compressed using an algorithm that introduces minimal artifacts, while the resolution of each frame may change with time.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of recording successive frames of raw sensor data depicting a moving scene, wherein the raw sensor data comprises pixel data for an image sensor having pixels arranged in correspondence to a mosaic of plural different colors in a color filter array, the method comprising:
designating a first sampling mosaic pattern for sampling the pixel data at a first resolution;
designating a second sampling mosaic pattern for sampling the pixel data at a second resolution which is lower than the first resolution;
selecting one of the first or the second sampling mosaic patterns for a frame by applying a predetermined rule, wherein the predetermined rule selects one of the first or second sampling mosaic patterns based on a frame sequential number;
sampling pixel data of the frame using the selected sampling mosaic pattern; and
recording the sampled pixel data for the frame onto a recording medium.

2. A method according to claim 1, further comprising repeated application of the steps of selecting, sampling and recording, for successive frames of the moving scene, whereby a mixed resolution sequence of mosaiced frames of pixel data is recorded on the recording medium.

3. A method according to claim 1, wherein the second sampling mosaic pattern is a subset of the first sampling mosaic pattern.

4. A method according to claim 1, wherein the color filter array is composed of a repeated pattern of plural different colors having a predesignated ratio of green pixels to red pixels and to blue pixels.

5. A method according to claim 4, wherein the predesignated ratio is substantially maintained in both of the first and second sampling mosaic patterns.

6. A method according to claim 5, wherein the color filter array corresponds to a Bayer pattern.

7. An apparatus comprising:
a computer-readable memory constructed to store computer-executable process steps; and
a processor constructed to execute the computer-executable process steps stored in the memory;
wherein the process steps stored in the memory cause the processor to record successive frames of raw sensor data depicting a moving scene, the raw sensor data comprising pixel data for an image sensor having pixels arranged in correspondence to a mosaic of plural different colors in a color filter array, the process steps comprising:

designating a first sampling mosaic pattern for sampling the pixel data at a first resolution;

designating a second sampling mosaic pattern for sampling the pixel data at a second resolution which is lower than the first resolution;

selecting one of the first or the second sampling mosaic patterns for a frame by applying a predetermined rule, wherein the predetermined rule selects one of the first or second sampling mosaic patterns based on a frame sequential number;

sampling pixel data of the frame using the selected sampling mosaic pattern; and recording the sampled pixel data for the frame onto a recording medium.

8. An apparatus according to claim 7, the process steps further comprising repeated application of the steps of selecting, sampling and recording, for successive frames of the moving scene, whereby a mixed resolution sequence of mosaiced frames of pixel data is recorded on the recording medium.

9. An apparatus according to claim 7, wherein the second sampling mosaic pattern is a subset of the first sampling mosaic pattern.

10. An apparatus according to claim 7, wherein the color filter array is composed of a repeated pattern of plural different colors having a predesignated ratio of green pixels to red pixels and to blue pixels.

11. A computer-readable memory medium on which is stored computer-executable process steps for causing a computer to perform recording successive frames of raw sensor data depicting a moving scene, the raw sensor data comprising pixel data for an image sensor having pixels arranged in correspondence to a mosaic of plural different colors in a color filter array, the process steps comprising:

designating a first sampling mosaic pattern for sampling the pixel data at a first resolution;

designating a second sampling mosaic pattern for sampling the pixel data at a second resolution which is lower than the first resolution;

selecting one of the first or the second sampling mosaic patterns for a frame by applying a predetermined rule, wherein the predetermined rule selects one of the first or second sampling mosaic patterns based on a frame sequential number;

sampling pixel data of the frame using the selected sampling mosaic pattern; and recording the sampled pixel data for the frame onto a recording medium.

12. A computer-readable memory medium according to claim 11, the process steps further comprising repeated application of the steps of selecting, sampling and recording, for successive frames of the moving scene, whereby a mixed resolution sequence of mosaiced frames of pixel data is recorded on the recording medium.

13. A computer-readable memory medium according to claim 11, wherein the second sampling mosaic pattern is a subset of the first sampling mosaic pattern.

14. A computer-readable memory medium according to claim 11, wherein the color filter array is composed of a repeated pattern of plural different colors having a predesignated ratio of green pixels to red pixels and to blue pixels.

15. A method of reconstructing image data for successive frames of a moving scene, comprising:

accessing a mixed resolution sequence of mosaiced frames of raw sensor data recorded on a recording medium, wherein the raw sensor data comprises pixel data for an image sensor having pixels arranged in correspondence to a mosaic of plural different colors in a color filter array;

wherein each frame of the mixed resolution sequence of mosaiced frames of raw sensor data comprises pixel data sampled at one of at least first and second sampling mosaic patterns respectively corresponding to first and second resolutions in which the second resolution is lower than the first resolution;

identifying whether an active frame corresponds to the first sampling mosaic pattern or to the second sampling mosaic pattern;

applying first or second processing to the active frame in respective correspondence to the identification of whether the active frame corresponds to the first sampling mosaic pattern or to the second sampling mosaic pattern;

wherein the first processing demosaics the raw sensor data by using the raw sensor data for the active frame, so as to obtain image data for the active frame;

wherein the second processing demosaics the raw sensor data by using the raw sensor data for the active frame as well as raw sensor data for a high resolution frame in close temporal proximity to the active frame, so as to obtain image data for the active frame; and outputting the image data for each frame for at least temporary storage and rendering.

16. A method according to claim 15, wherein the first processing uses only the raw sensor data for the active frame.

17. A method according to claim 15, wherein the second processing uses raw sensor data for a pair of high resolution frames in close temporal proximity before and after the active frame, and applies interpolation to the raw sensor data for the pair of high resolution frames.

18. A method according to claim 17, wherein the second processing uses only interpolated data for pixels of the active frame corresponding to high resolution sites for which data is not available, and uses only raw sensor data of the active frame for pixels of the active frame corresponding to high resolution sites for which data is available.

19. A method according to claim 15, wherein the color filter array corresponds to a Bayer pattern.

20. An apparatus comprising:

a computer-readable memory constructed to store computer-executable process steps; and a processor constructed to execute the computer-executable process steps stored in the memory;

wherein the process steps stored in the memory cause the processor to reconstruct image data for successive frames of a moving scene, the process steps comprising:

accessing a mixed resolution sequence of mosaiced frames of raw sensor data recorded on a recording medium, wherein the raw sensor data comprises pixel data for an image sensor having pixels arranged in correspondence to a mosaic of plural different colors in a color filter array;

wherein each frame of the mixed resolution sequence of mosaiced frames of raw sensor data comprises pixel data sampled at one of at least first and second sampling mosaic patterns respectively corresponding to first and second resolutions in which the second resolution is lower than the first resolution;

identifying whether an active frame corresponds to the first sampling mosaic pattern or to the second sampling mosaic pattern;

applying first or second processing to the active frame in respective correspondence to the identification of whether the active frame corresponds to the first sampling mosaic pattern or to the second sampling mosaic pattern;

wherein the first processing demosaics the raw sensor data by using the raw sensor data for the active frame, so as to obtain image data for the active frame;

wherein the second processing demosaics the raw sensor data by using the raw sensor data for the active frame as well as raw sensor data for a high resolution frame in close temporal proximity to the active frame, so as to obtain image data for the active frame; and outputting the image data for each frame for at least temporary storage and rendering.

21. A computer-readable memory medium on which is stored computer-executable process steps for causing a computer to perform reconstructing image data for successive frames of a moving scene, the process steps comprising:

accessing a mixed resolution sequence of mosaiced frames of raw sensor data recorded on a recording medium, wherein the raw sensor data comprises pixel data for an image sensor having pixels arranged in correspondence to a mosaic of plural different colors in a color filter array;

wherein each frame of the mixed resolution sequence of mosaiced frames of raw sensor data comprises pixel data sampled at one of at least first and second sampling mosaic patterns respectively corresponding to first and second resolutions in which the second resolution is lower than the first resolution;

identifying whether an active frame corresponds to the first sampling mosaic pattern or to the second sampling mosaic pattern;

applying first or second processing to the active frame in respective correspondence to the identification of whether the active frame corresponds to the first sampling mosaic pattern or to the second sampling mosaic pattern;

wherein the first processing demosaics the raw sensor data by using the raw sensor data for the active frame, so as to obtain image data for the active frame;

wherein the second processing demosaics the raw sensor data by using the raw sensor data for the active frame as well as raw sensor data for a high resolution frame in close temporal proximity to the active frame, so as to obtain image data for the active frame; and outputting the image data for each frame for at least temporary storage and rendering.

* * * * *